United States Patent
Yeung

(10) Patent No.: US 11,537,722 B1
(45) Date of Patent: Dec. 27, 2022

(54) PASSIVE SOFTWARE IDENTIFICATION FOR VULNERABILITY MANAGEMENT

(71) Applicant: Rapid7, Inc., Boston, MA (US)

(72) Inventor: Sheung Hei Joseph Yeung, Toronto (CA)

(73) Assignee: Rapid7, Inc., Boston, MA (US)

( * ) Notice: Subject to any disclaimer, the term of this patent is extended or adjusted under 35 U.S.C. 154(b) by 309 days.

(21) Appl. No.: 16/861,339

(22) Filed: Apr. 29, 2020

(51) Int. Cl.
| | |
|---|---|
| *G06F 21/57* | (2013.01) |
| *G06F 21/51* | (2013.01) |
| *G06F 9/445* | (2018.01) |
| *G06F 21/55* | (2013.01) |
| *G06F 8/71* | (2018.01) |
| *G06F 21/56* | (2013.01) |
| *G06F 21/00* | (2013.01) |

(52) U.S. Cl.
CPC .............. *G06F 21/577* (2013.01); *G06F 8/71* (2013.01); *G06F 9/44505* (2013.01); *G06F 21/51* (2013.01); *G06F 21/552* (2013.01); *G06F 21/554* (2013.01); *G06F 21/566* (2013.01)

(58) Field of Classification Search
CPC ...... G06F 21/577; G06F 21/51; G06F 21/552; G06F 21/554; G06F 21/50; G06F 21/52; G06F 21/57
See application file for complete search history.

(56) References Cited

U.S. PATENT DOCUMENTS

| | | | |
|---|---|---|---|
| 7,950,056 B1* | 5/2011 | Satish | G06F 21/554 |
| | | | 709/224 |
| 2019/0235934 A1* | 8/2019 | Chanda | G06F 21/53 |

* cited by examiner

*Primary Examiner* — Edward Zee
(74) *Attorney, Agent, or Firm* — Ashwin Anand

(57) ABSTRACT

Disclosed herein are methods, systems, and processes to perform passive and realtime software identification and data collection for vulnerability management. Vulnerability management based on agent-collected event data involves monitoring a process start event associated with an application executing on a computing device that is part of a network, identifying a binary location of the process start event, and based on the binary location, identifying a software type of the application and a version of the software type. Vulnerability management based on event data in logs involves monitoring the process start event for configuration or file changes, generating fingerprint rules by mapping the configuration or files changes and the process start event associated with a software installation or an upgrade of the software, and processing log data to fingerprint the software type and the version of the software type. Agent-collected event data and event data in logs can be amalgamated to perform software and version identification for vulnerability management.

12 Claims, 6 Drawing Sheets

PASSIVE SOFTWARE IDENTIFICATION FOR VULNERABILITY MANAGEMENT

BACKGROUND

Field of the Disclosure

This disclosure is related is to vulnerability management in cybersecurity computing environments. In particular, this disclosure is related to passive software identification and data collection using realtime data for vulnerability management.

Description of the Related Art

Vulnerability management is the process of identifying, evaluating, treating, and/or reporting on security vulnerabilities in computing systems and the software that executes on such computing systems. Vulnerability management helps organizations to prioritize possible threats and minimize their attack surface. Security vulnerabilities are technological weaknesses that allow malicious attacks to compromise a computing device.

Vulnerability management depends on quickly and accurately identifying software (e.g., applications) installed or executing on a given computing system to determine whether that software is prone to any vulnerabilities. Unfortunately, existing vulnerability management systems typically comb through host computing systems (e.g., the hard drive) in a repetitive and redundant manner to identify the existence of certain types of software. What's more, existing vulnerability management systems also do not incorporate log data (e.g., collected by log management systems for incident detection and response) to identify software for vulnerability management.

Rummaging through a hard drive to identify software for vulnerability management is resource intensive and wasteful. In addition, performing software discovery in this manner is extremely time-consuming—a luxury that is typically unavailable in critical cybersecurity computing environments. Further, without the benefit of log data and the information gleaned from such log data, traditional software discovery for vulnerability management is sub-optimal. What's needed is realtime software identification and data collection for vulnerability management.

SUMMARY OF THE DISCLOSURE

Disclosed herein are methods, systems, and processes to perform realtime software identification for vulnerability management. One such method involves monitoring, using an agent, a process start event associated with an application executing on a computing device that is part of network, identifying a binary location of the process start event, and based on the binary location of the process start event, determining a software type of the application and a version of the software type.

In one embodiment, the method involves accessing a record of previously processed binaries, and if a binary in the binary location is part of the record of previously processed binaries, inhibiting the processing of the binary. In another embodiment, determining whether the binary should be processed to determine the software type of the application and the version of the software type is based on a frequency of the process start event.

In certain embodiments, the method involves monitoring the process start event for one or more configuration modifications or one or more file modifications, generating one or more fingerprint rules by mapping the one or more file modifications and one or more events associated with a software installation or an upgrade of the application, and processing log data comprising the process start event with the one or more fingerprint rules to fingerprint the software type and the version of the software type.

In some embodiments, the method involves identifying one or more vulnerabilities associated with the software type and the version of the software type and quarantining the application from being accessed by the computing device and one or more other computing device that are part of the network.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

Figure 1:
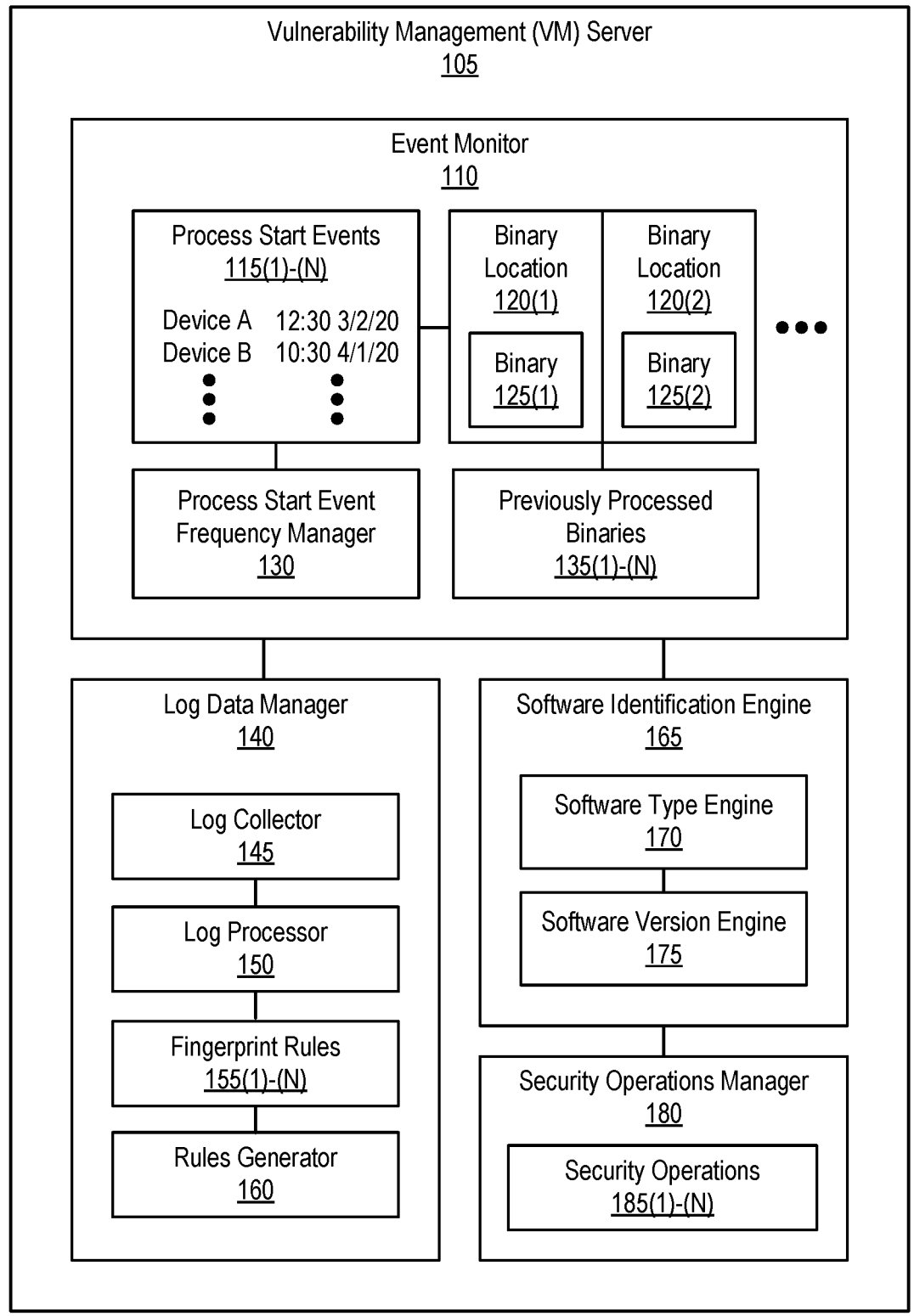
FIG. 1 is a block diagram 100 of a vulnerability management (VM) server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

In modern cybersecurity computing environments, vulnerability management (VM) is implemented to identify, evaluate, and alert on security vulnerabilities in complex computing and/or networking environments. As noted, security vulnerabilities are technological weaknesses (e.g., software flaws, configuration faults, an application that has not been updated and/or upgraded and the like) that can allow a malicious attacker to compromise a computing device and exfiltrate confidential data or cause other types of harm. Therefore, vulnerability management helps businesses and enterprises prioritize security-related threats and minimize their "attack surface." Unfortunately, given the large number of possible or potential vulnerabilities in a given environment, prioritizing which vulnerability should be remediated first (before attending to other less critical vulnerabilities) is a significant technology-related challenge.

Vulnerability management requires software discovery—that is, identifying software installed or executing on a given computing device or system so that vulnerabilities that are associated with that given piece of software (e.g., an application) can be identified and highlighted (e.g., for further action such as remediation). Software discovery is typically a resource and time intensive process because existing solutions depending on combing a hard drive of a given computing device to identify the existence of certain types of software—which requires (and takes) significant processing power, expensive memory utilization, and valuable time.

In cybersecurity computing environments, time is a luxury that is often unavailable. Responding to a vulnerability promptly requires that the foregoing software discovery process commence and conclude in a timely manner while minimizing the utilization of expensive computing resources (e.g., processing power, memory utilization, network bandwidth, storage, and the like). Unfortunately, existing vulnerability management systems typically scour through storage devices associated with host computing systems in a repetitive and redundant manner to identify the existence of certain types of software—a time and resource-intensive process to say the least. In addition, existing vulnerability management systems also do not incorporate log data (e.g., process start events collected by log management systems for incident detection and response, and the like) to identify software for vulnerability management.

As noted, digging through a hard drive to identify software for vulnerability management is resource intensive and time consuming. For example, in existing implementations, an agent (e.g., a software agent deployed on a protected host for data collection purposes, among other reasons) painstakingly searches a hard drive (or other storage medium) for the existence of software (e.g., by using a brute force approach to identify software such as Java®, Apache®, and the like, on the hard drive or the other storage device). This operation utilizes expensive input/output (I/O) resources on the asset (e.g., the protected host) and is time consuming.

Also as noted, without the benefit of log data and the information gleaned from such log data, traditional software discovery for vulnerability management is sub-optimal. For example, many cybersecurity computing systems typically incorporate a log management solution that collects log data from a customer's environment for analysis (e.g., for incident detection and response, among other reasons). It is highly likely that some portion of the collected log data potentially includes events (e.g., process start events, process stop events, and the like) that may contain data that can be used to identify and fingerprint installed software, versions of said software, and one or more vulnerabilities associated with said software. Unfortunately, existing implementations do not integrate realtime log data as a rich and potent source of events to supplement agent-collected data for vulnerability management.

Disclosed herein are methods, systems, and processes to perform realtime software identification and data collection for vulnerability management by using real time process events to trigger collection of additional data for a specific process to identify software from a combination of event data and log data.

Example Vulnerability Management Server

FIG. 1 is a block diagram 100 of a vulnerability management (VM) server 105, according to one embodiment. VM server 105 can be any type of computing device (e.g., a physical server with a memory and a processor for processing instructions) and includes at least an event monitor 110 for collecting, analyzing, and processing event data (e.g., process start event data). Event monitor 110 includes at least process start events 115(1)-(N), binary locations 120(1)-(N) with binaries 125(1)-(N) (of process start events 115(1)-(N)), process start event frequency manager 130, and previously processed binaries 135(1)-(N).

A process start event is a "computing" event that is recorded by a computing system (e.g., by an operating system (OS)). When a program or an application on a computing device starts, a "process" is created that stays open until the program exits. When the process is created and opened, the OS creates and records (e.g., in a log or memory) a "process start event." Similarly, when the program exists and the process stops, the OS creates and records a "process stop/end event." A process is typically identified by a Process ID, which can be used to correlate the event associated with the process to other events to determine what the program or application did while it ran/executed and when it exited.

In vulnerability management, a process start event is crucial to identifying the type of software (e.g., software type) that has begun execution as well as the version of the software (e.g., version of the software type) to determine whether there are one or more security vulnerabilities associated with that software and its version. A process start event typically records a security ID (the security identifier (SID) of the account that is used to start the program or application), an account name (the account logon name), an account domain (the domain or in the case of local accounts, a computer name), and a logon ID (a semi-unique number that identifies the logon session. The process start event also records process information such as new process ID (a semi-unique number that identifies the process and can be used to correlate other events logged during the same process), a new process name (the full path of the executable), token elevation type (for user access control), and a mandatory label (Mandatory Integrity Control (MIC) in Windows® to verify the integrity of the process).

In one embodiment, instead of searching the hard drive of a computing device for software that is currently executing, event monitor 110 analyzes the information recorded by a process start event to determine the path to a binary of a process (e.g., binary location 120(1) (e.g., the path) of binary 125(1) of process start event 115(1)) to identify the software type and the version of the software type that started the process (and that caused the creation of the process start event). For example, event monitor 110 can receive process start event data collected by an on-premise agent that executes on the computing device or from log data generated by the computing device. Event monitor 110 then selectively extracts binary location information from the process start event data to identify a software type and a version of the software type based on the binary location to provide an additional categorization of the software.

As shown in FIG. 1, VM server 105 also includes a software identification engine 165 that includes at least a software type engine 170 and a software version engine 175.

Once event monitor 110 monitors process start events and evaluates the binary locations from the process start events (as discussed above), software identification engine 165 uses the location of the binary to identify the software type of the executing application using software type engine 170 and the version of the software type of the executing application using software version engine 175. In this manner, event monitor 110 and software identification engine 165 utilize realtime process events to trigger collections of additional data for a specific process. Because the foregoing implementation collects software identification data based on events, disk I/O is significantly reduced compared to existing hard drive brute force methods.

In some embodiments, event monitor 110 implements a mechanism to prevent the same binary location from being processed frequently by using previously processed binaries 135(1)-(N). For example, event monitor 110 gates the processing of redundant binaries by maintaining a record of previously processed binaries 135(1)-(N) and stopping the processing of process start event data if binary locations therein reveal binaries that have been previously processed—further saving valuable computing resources on the protected host. In other embodiments, process start event frequency manager 130 of event monitor 110 also determines whether certain binaries should be processed based on the frequency of the event being started (e.g., to process or not process binary location information if a given process is being started too frequently or not frequently enough—depending on which scenario indicates malicious use based on historical data and threshold requirements of specific cybersecurity computing environments).

Therefore, inhibiting the processing redundant binaries based on previously processed binaries and further inhibiting the processing binaries based on the frequency of a given event for software identification purposes (that can possibly be identified more quickly using other methods or from existing binary location data or log data) significantly reduces computing resource utilization on an asset (e.g., a protected host) and also provides quicker results that can be acted upon promptly. In addition, not depending on and being limited by time consuming and resource intensive brute force mechanisms to identify software types and software versions for vulnerability management not only frees up storage and processing on a protected host, but also considerably optimizes the speed of realtime software identification.

As shown in FIG. 1, VM server 105 also includes a log data manager 140. Log data manager 140 receives log data from protected hosts and assets and maintains and processes the log data to supplement the process start event data evaluated by event monitor 110 (e.g., process start event data that is received from an agent executing on a protected host). Therefore, log data manager 140 extracts process start events from log data and permits software identification engine 165 to perform software identification by amalgamating process start events from log data (received from log data manager 140) and process start events with binary locations from agent-collected data (received by event monitor 110). In this manner, in addition to triggering the collection of event data for process start events associated with a specific process, VM server 105 also facilitates the supplementation of agent-collected data with event data for process start events associated with one or more processes from log data—providing a supplementary source to fingerprint software and improve accuracy without demanding additional resource consumption from protected assets in customer computing environments.

Log data manager 140, as shown in FIG. 1, includes at least a log collector 145, a log processor 150, fingerprint rules 155(1)-(N), and a rules generator 160. A log forwarded (e.g., on a protected host or asset) forwards logs (and log data) to log processor 150. Log collector 145 monitors the received logs and log data for events, and in particular, configuration modifications and file modifications associated with said events.

In certain embodiments, rules generator 160 generates fingerprint rules 155(1)-(N) by mapping file changes and events related to software installations or upgrades. Log collector 145 then sends log data to log processor 150. Log processor 150 processes the log data with fingerprint rules 155(1)-(N) to fingerprint the name of the software and the version of the software. Log processor 150 first identifies the name of the software and then matches the software version (of the software) to one or more known fingerprint rules. If a match is detected, log processor 150 broadcasts a notification to software identification engine 165 and/or event monitor 110. It should be noted that in existing vulnerability systems and implementations, fingerprinting is performed actively by probing a target system such as a protected host. Log data manager 140 performs fingerprinting for software identification purposes in a passive manner—without interacting with the target system (e.g., just by using log data). This passive log data-based fingerprinting saves significant processing and memory resources of the protected host.

Example Realtime Software Identification System for Vulnerability Management

Figure 2:
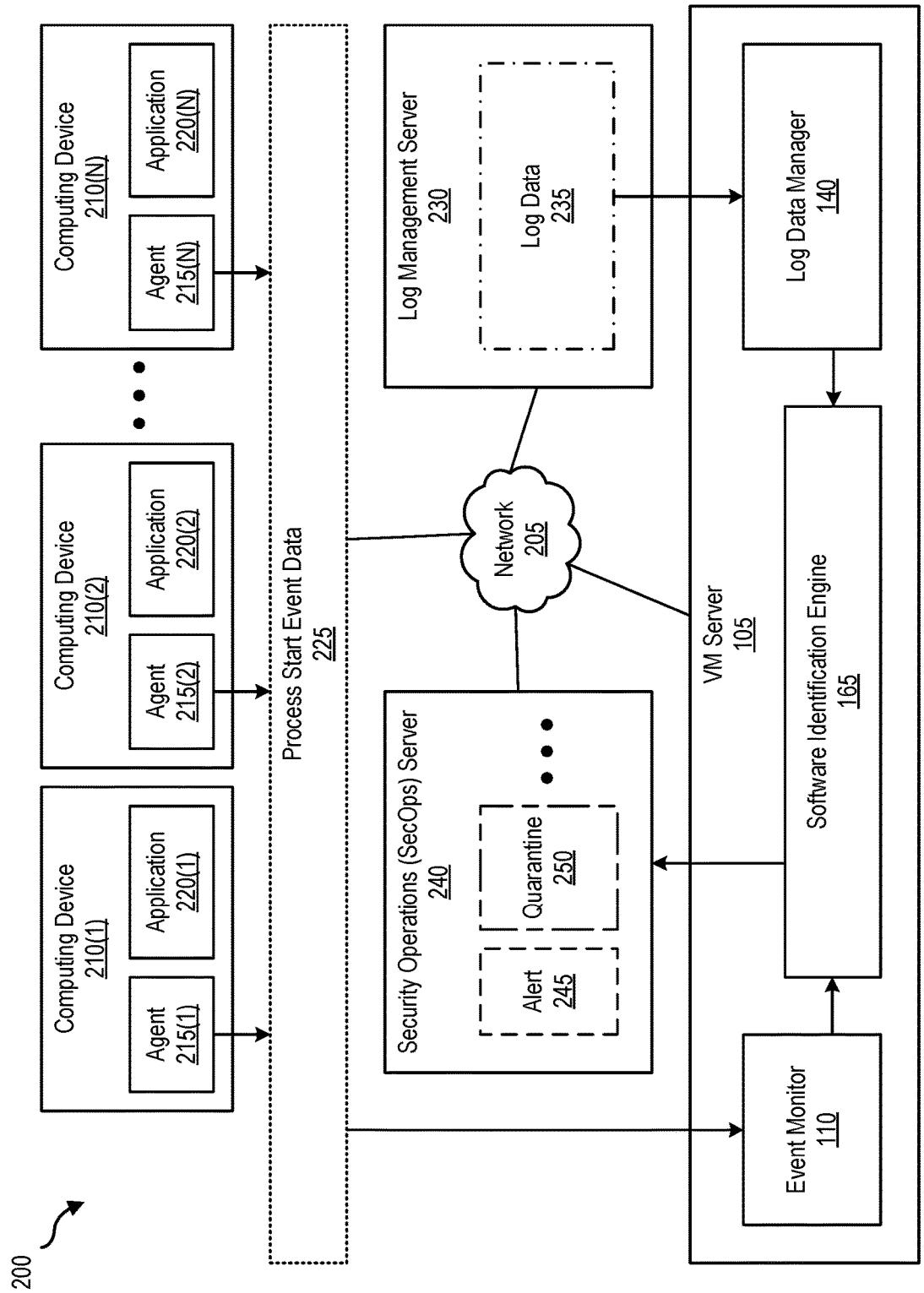
FIG. 2 is a block diagram 200 of a realtime software identification system that uses process start events and log data, according to one embodiment of the present disclosure.

FIG. 2 is a block diagram 200 of a realtime software identification system that uses process start events and log data, according to one embodiment. Computing devices 210(1)-(N), security operations (SecOps) server 240, and/or log management server 230 can be any type of physical or virtual computing devices (e.g., laptops, desktops, mobile devices, virtual machines, and the like), network 205 can be any type of network or interconnection (e.g., a Wide Area Network (WAN), a Local Area Network (LAN), a Storage Area Network (SAN), the Internet, and the like), and applications 220(1)-(N) can each be any type of software, computer program, or executable (e.g., Java®, Apache®, Microsoft Word®, and the like).

In one embodiment, event monitor 110 of VM server 105 monitors, using an agent (e.g., agents 215(1)), a process start event (e.g., process start event 115(1)) associated with an application (e.g., application 220(1)) executing on a computing device (e.g., computing device 210(1)) that is part of a network (e.g., network 205). Event monitor 110 then identifies a binary location of the process start event (e.g., binary location 120(1) or process start event 115(1) as shown in FIG. 1), and based on the binary location of the process start event, determines a software type of the application and a version of the software type (e.g., using software type engine 170 and software version engine 175, respectively).

In another embodiment, event monitor 110 accesses a record of previously processed binaries (e.g., previously processed binaries 135(1)-(N)), and if a binary in the binary location is part of the record of the previously processed binaries, inhibits the processing of the binary. In some examples, event monitor 110 determines whether the binary should be processed to determine the software type of the application and the version of the software type based on a frequency of the process start event determined by process start event frequency manager 130.

In some alternative embodiments, security operations manager 180 (e.g., as shown in FIG. 1) identifies one or more vulnerabilities associated with the software type and the version of the software type (as determined by software identification engine 165) and quarantines the application from being accessed by the computing device and one or more other computing device that are part of the network (e.g., by performing one or more security operations 185(1)-(N) such as alert 245, quarantine 250, and the like, using SecOps server 240).

In other embodiments, log data manager 140 monitors a process start event for one or more configuration modifications and/or one or more file modifications and generates fingerprint rules by mapping any configuration modifications and/or file modifications with a software installation or an upgrade of the application. In this example, log data manager 140 processes log data 235 that includes the process start event with one or more fingerprint rules (e.g., fingerprint rules 155(1)-(N)) to fingerprint the software type and the version of the software type.

Figure 3:
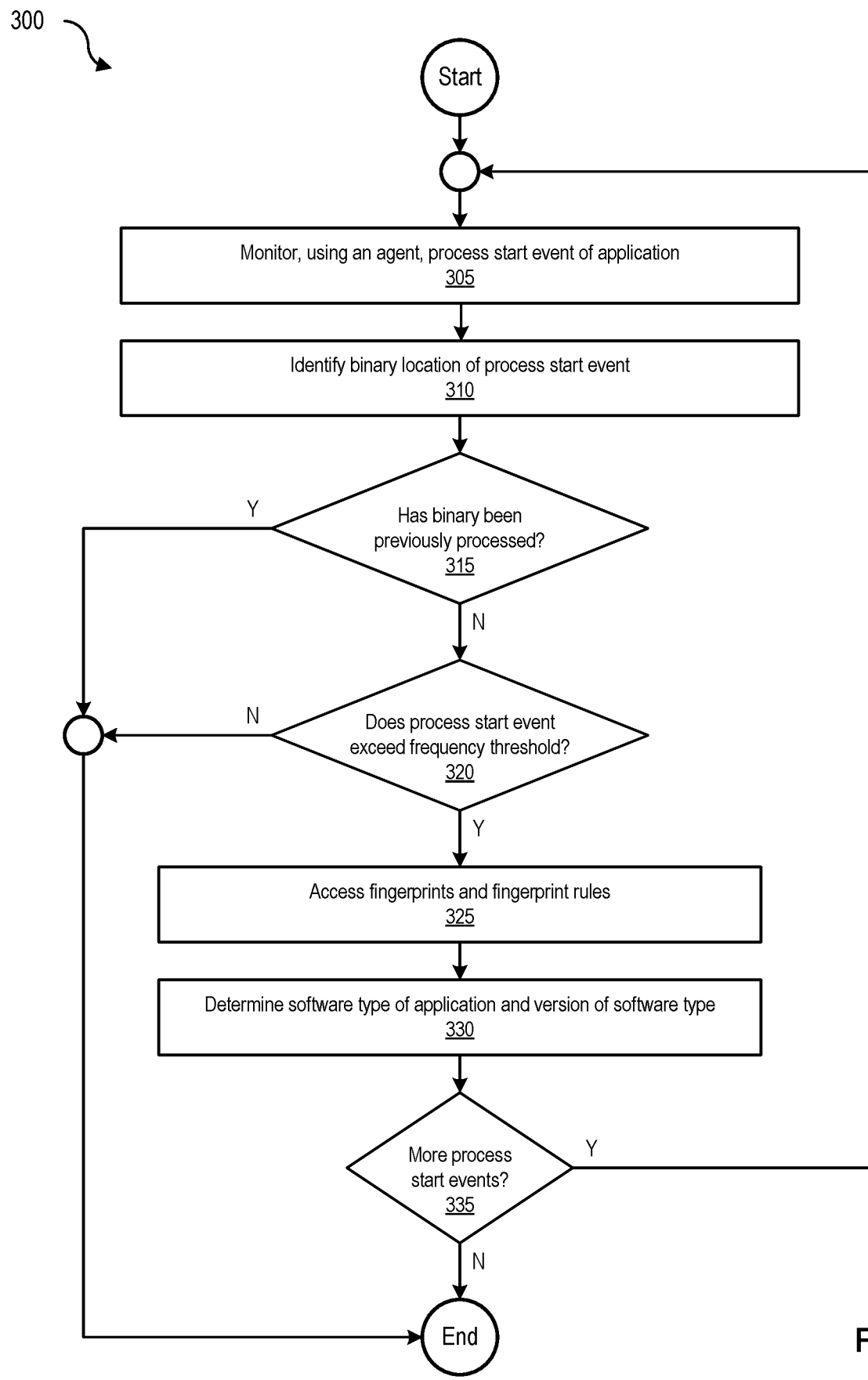
FIG. 3 is a flowchart 300 of a process for determining a software type and version, according to one embodiment of the present disclosure.

Example Processes to Perform Software Identification for Vulnerability Management FIG. 3 is a flowchart 300 of a process for determining a software type and version, according to one embodiment. The process begins at 305 by monitoring, using an agent, a process start event of an application, and at 310, identifies a binary location of the process start event. At 315, the process determines whether the binary (in the binary location) has been previously processed. If the binary has been previously processed, the process ends. Otherwise, if the binary has not been previously processed, the process, at 320, determines whether the process start event exceeds a frequency threshold. If the process start event does not exceed a frequency threshold, the process ends. However, if the process start event exceeds the frequency threshold (indicating that a malicious use of the process is likely ongoing), the process, at 325, accesses fingerprints and fingerprint rules. At 330, the process determines a software type of the application and version of the software type. At 335, the process determines if there are more process start events. If there are more process start events, the process loops to 305. Otherwise, the process ends.

Figure 4:
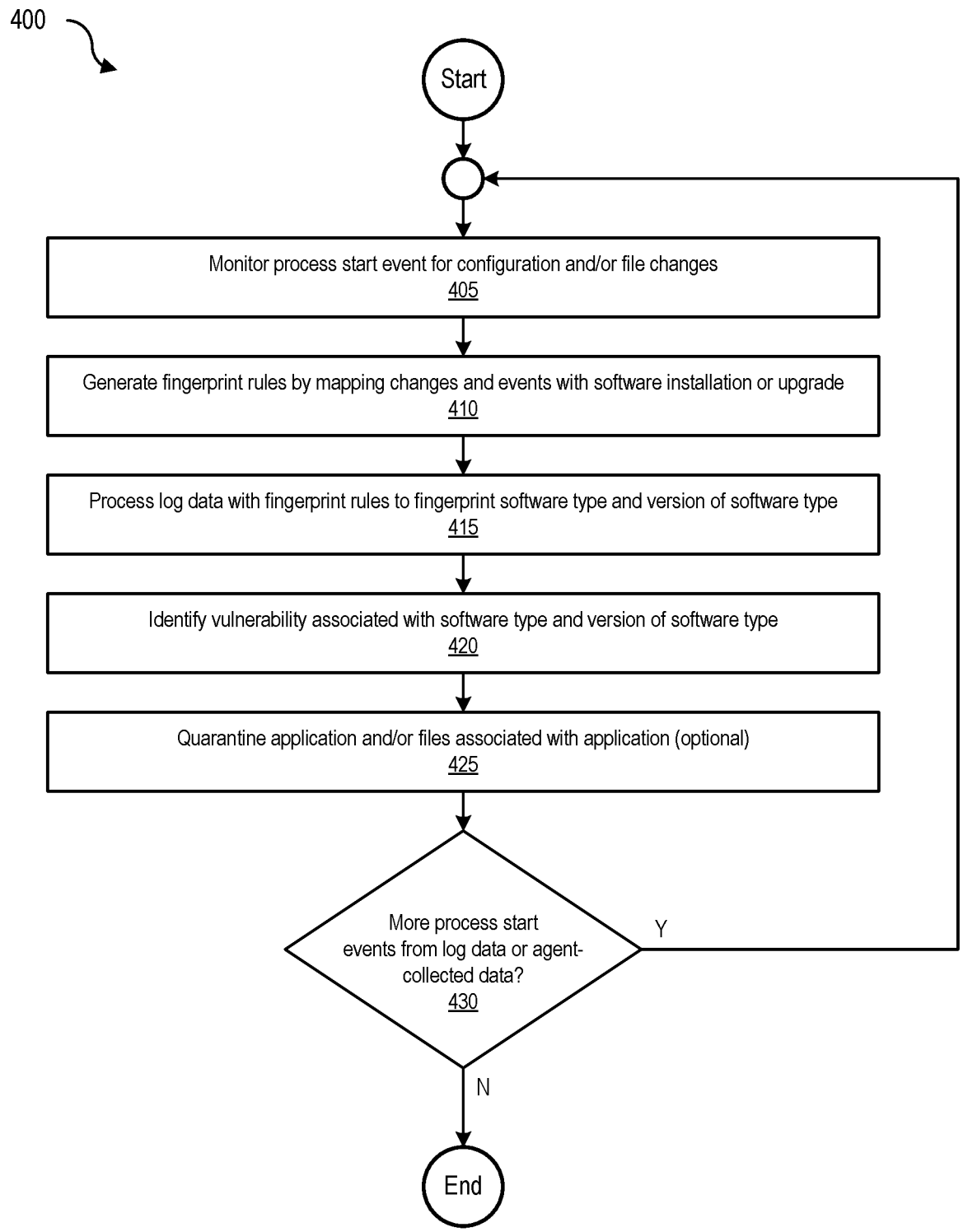
FIG. 4 is a flowchart 400 of a process for performing realtime vulnerability management, according to one embodiment of the present disclosure.

FIG. 4 is a flowchart 400 of a process for performing realtime vulnerability management, according to one embodiment. The process begins at 405 by monitoring a process start event for configuration changes and/or file changes. At 410, the process generates fingerprint rules by mapping changes and events (e.g., process start events) with a software installation or upgrade, and at 415, processes log data with fingerprint rules to fingerprint the software type and the version of the software type. At 420, the process identifies one or more vulnerabilities associated with the software type and/or the version of the software type. Optionally, at 425, the process quarantines the application and/or files associated with the application, and at 430, determines if there are more process start events from log data or agent-collected data. If there are more process start events, the process loops to 405. Otherwise, the process ends.

Example Computing Environment

Figure 5:
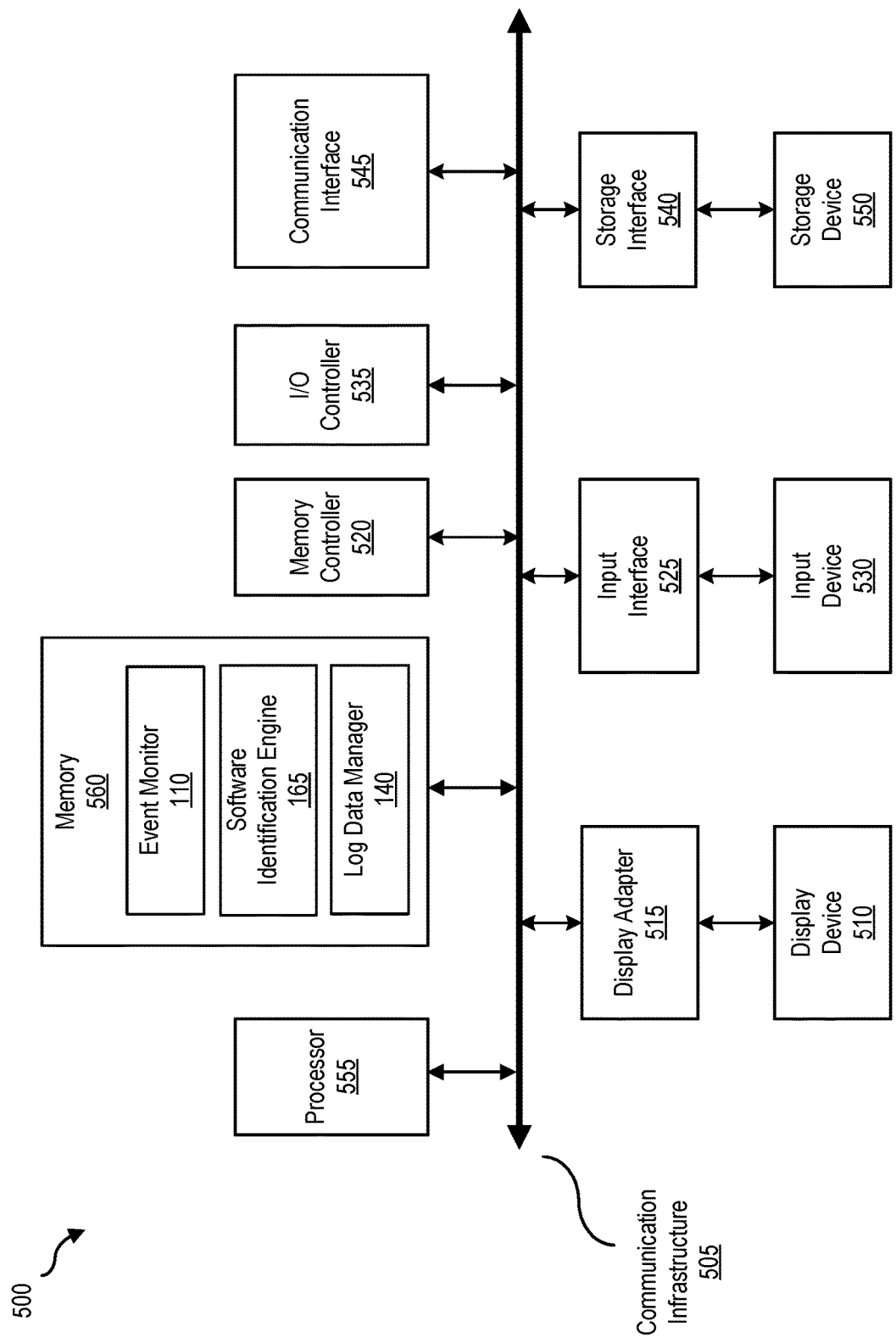
FIG. 5 is a block diagram 500 of a computing system, illustrating how a software identification engine, an event monitor, and/or a log data manager can be implemented in software, according to one embodiment of the present disclosure.

FIG. 5 is a block diagram 500 of a computing system, illustrating how a software identification engine, an event monitor, and/or a log data manager can be implemented in software, according to one embodiment. Computing system 500 can include VM server 105 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 555 and a memory 560. By executing the software that executes software identification engine 165, event monitor 110, and/or log data manager 140, computing system 500 becomes a special purpose computing device that is configured to perform realtime software identification for vulnerability management.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein. Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 500 may include both a volatile memory unit and a non-volatile storage device. In one example, program instructions implementing software identification engine 165, event monitor 110, and/or log data manager 140 may be loaded into memory 560.

In certain embodiments, computing system 500 may also include one or more components or elements in addition to processor 555 and/or memory 560. For example, as illustrated in FIG. 8, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein. I/O controller 535 generally represents any type or form of module capable of coordinating and/or controlling the input and output functions of a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type/form of communication device/adapter capable of facilitating communication between computing system 500 and other devices and may facilitate communication between computing system 500 and a private or public network. Examples of communication interface 545 include, a wired network interface (e.g., network interface card), a wireless network interface (e.g., a wireless network interface card), a modem, and any other suitable interface. Communication interface 545 may provide a direct connection to a remote server via a direct link to a network, such as the Internet, and may also indirectly provide such a connection through, for example, a local area network. Communication interface 545 may also represent a host adapter configured to facilitate communication between computing system 500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 500 may also include at least one display device 510 coupled to communication infrastructure 505 via a display adapter 515 that generally represents any type or form of device capable of visually displaying information forwarded by display adapter 515. Display adapter 515 generally represents any type or form of device configured to forward graphics, text, and other data from communication infrastructure 505 (or from a frame buffer, as known in the art) for display on display device 510. Computing system 500 may also include at least one input device 530 coupled to communication infrastructure 505 via an input interface 525. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 8 need not be present to practice the embodiments described and/or illustrated herein. The devices and subsystems referenced above may also be interconnected in different ways from that shown in FIG. 8. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560, and/or various portions of storage device 550. When executed by processor 555, a computer program loaded into computing system 500 may cause processor 555 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 6:
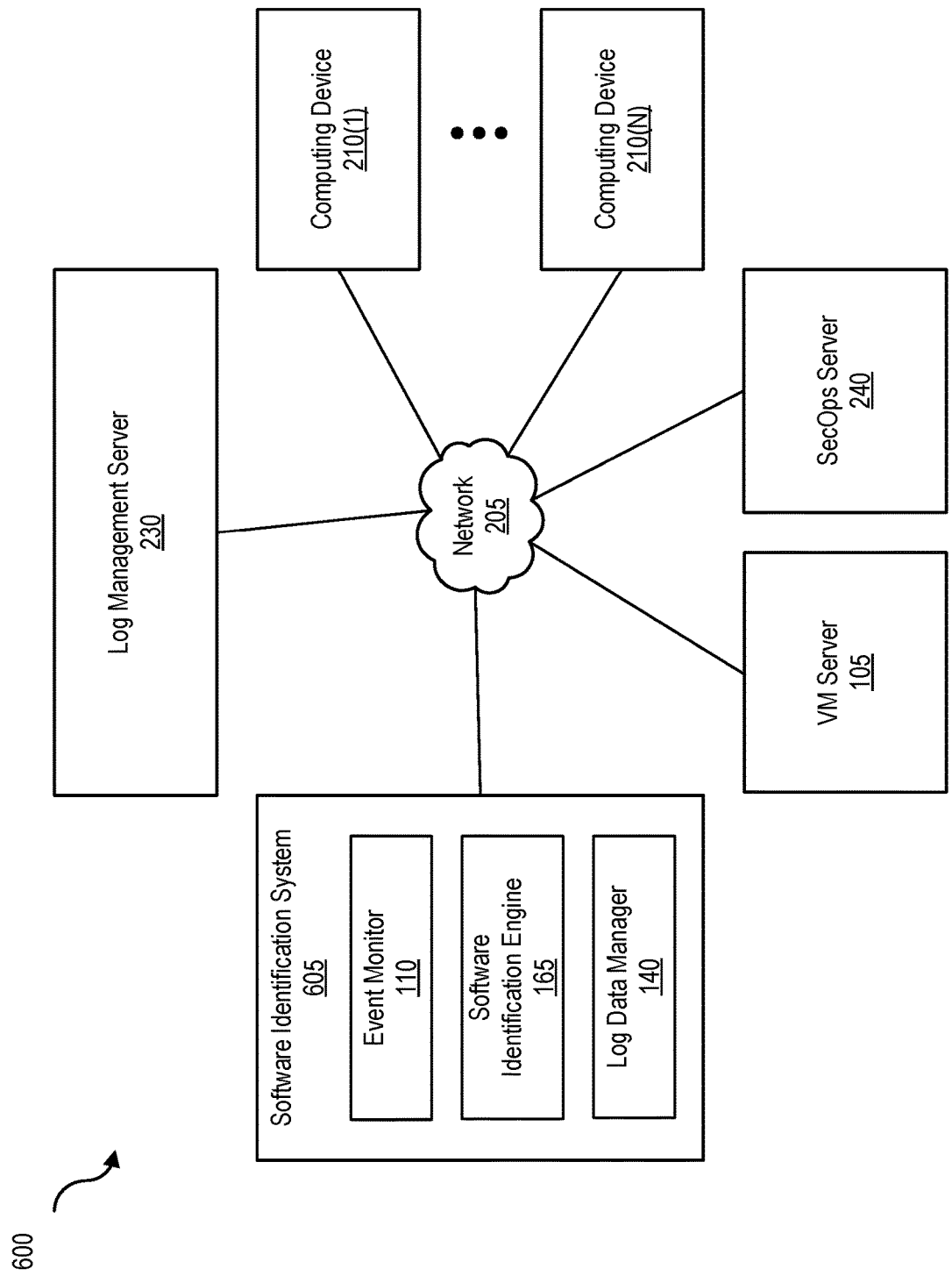
FIG. 6 is a block diagram 600 of a networked system, illustrating how various devices can communicate via a network, according to one embodiment of the present disclosure.

FIG. 6 is a block diagram of a networked system, illustrating how various computing devices can communicate via a network, according to one embodiment. Network 205 generally represents any type or form of computer network or architecture capable of facilitating communication between VM server 105, computing devices 210(1)-(N), SecOps server 240, log management server 230, and/or software identification system 905. In certain embodiments, a communication interface, such as communication interface 545 in FIG. 5, may be used to provide connectivity between VM server 105, computing devices 210(1)-(N), SecOps server 240, log management server 230, and/or software identification system 605, and network 205. The embodiments are not limited to the Internet or any particular network-based environment.

In some embodiments, software identification engine 165, event monitor 110, and/or log data manager 140 may be part of VM server 105 or may be separate. If separate, software identification engine 165, event monitor 110, and/or log data manager 140 may be communicatively coupled to VM server 105 via network 140. In one embodiment, all or a portion of one or more of embodiments may be encoded as a computer program and loaded onto and executed by VM server 105, SecOps server 240, and/or software identification system 605, or any combination thereof, and may be stored on VM server 105, SecOps server 240, and/or software identification system 605, and distributed over network 205.

In some examples, all or a portion of VM server 105, computing devices 210(1)-(N), SecOps server 240, log management server 230, and/or software identification system 605 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, software identification engine 165, event monitor 110, and/or log data manager 140 may transform the behavior of VM server 105 or software identification system 605 to perform passive and realtime software identification for vulnerability management.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
monitoring, using an agent, a process start event associated with an application executing on a computing device that is part of a network;
identifying a binary location of the process start event;
based on the binary location of the process start event, determining a software type of the application and a version of the software type;
accessing a record of previously processed binaries;
if a binary in the binary location of the process start event is part of the record of previously processed binaries, inhibiting the processing of the binary; and
determining whether the binary should be processed to determine the software type of the application and the version of the software type based on a frequency of the process start event.

2. The computer-implemented method of claim 1, further comprising:
monitoring the process start event for one or more configuration modifications or one or more file modifications.

3. The computer-implemented method of claim 2, further comprising:
generating one or more fingerprint rules by mapping the one or more file modifications and one or more events associated with a software installation or an upgrade of the application.

4. The computer-implemented method of claim 3, further comprising:
processing log data comprising the process start event with the one or more fingerprint rules to fingerprint the software type and the version of the software type.

5. The computer-implemented method of claim 1, further comprising:
identifying a vulnerability associated with the software type and the version of the software type; and
quarantining the application from being accessed by the computing device and one or more other computing device that are part of the network.

6. A non-transitory computer readable storage medium comprising program instructions executable to:
monitor, using an agent, a process start event associated with an application executing on a computing device that is part of a network;
identify a binary location of the process start event;
based on the binary location of the process start event, determine a software type of the application and a version of the software type;
access a record of previously processed binaries;
if a binary in the binary location of the process start event is part of the record of previously processed binaries, inhibit the processing of the binary; and
determine whether the binary should be processed to determine the software type of the application and the version of the software type based on a frequency of the process start event.

7. The non-transitory computer readable storage medium of claim 6, further comprising program instructions executable to:
monitor the process start event for one or more configuration modifications or one or more file modifications; and
generate one or more fingerprint rules by mapping the one or more file modifications and one or more events associated with a software installation or an upgrade of the application.

8. The non-transitory computer readable storage medium of claim 7, further comprising program instructions executable to:
process log data comprising the process start event with the one or more fingerprint rules to fingerprint the software type and the version of the software type.

9. The non-transitory computer readable storage medium of claim 6, further comprising program instructions executable to:
identify a vulnerability associated with the software type and the version of the software type; and
quarantine the application from being accessed by the computing device and one or more other computing device that are part of the network.

10. A system comprising:
one or more processors; and
a memory coupled to the one or more processors, wherein the memory stores program instructions executable by the one or more processors to:
monitor, using an agent, a process start event associated with an application executing on a computing device that is part of a network;
identify a binary location of the process start event;
based on the binary location of the process start event, determine a software type of the application and a version of the software type;
access a record of previously processed binaries;
if a binary in the binary location of the process start event is part of the record of previously processed binaries, inhibit the processing of the binary; and
determine whether the binary should be processed to determine the software type of the application and the version of the software type based on a frequency of the process start event.

11. The system of claim 10, further comprising program instructions executable by the one or more processors to:
identify a vulnerability associated with the software type and the version of the software type; and
quarantine the application from being accessed by the computing device and one or more other computing device that are part of the network.

12. The system of claim 10, further comprising program instructions executable by the one or more processers to:
monitor the process start event for one or more configuration modifications or one or more file modifications;

generate one or more fingerprint rules by mapping the one or more file modifications and one or more events associated with a software installation or an upgrade of the application; and process log data comprising the process start event with the one or more fingerprint rules to fingerprint the software type and the version of the software type.

\* \* \* \* \*